(12) United States Patent
Pottiez et al.

(10) Patent No.: US 8,978,454 B2
(45) Date of Patent: Mar. 17, 2015

(54) PRESSURE GAUGE

(71) Applicant: BorgWarner BERU Systems GmbH, Ludwigsburg (DE)

(72) Inventors: Christian Pottiez, Eppingen (DE); Bernd Last, Reutlingen (DE); Georg Rixecker, Leinfelden-Echterdingen (DE)

(73) Assignee: BorgWarner Ludwigsburg GmbH, Lugwigsburg (DE)

( * ) Notice: Subject to any disclaimer, the term of this patent is extended or adjusted under 35 U.S.C. 154(b) by 0 days.

(21) Appl. No.: 14/051,930

(22) Filed: Oct. 11, 2013

(65) Prior Publication Data

US 2014/0109661 A1   Apr. 24, 2014

(30) Foreign Application Priority Data

Oct. 24, 2012   (DE) .......................... 10 2012 110 142

(51) Int. Cl.
| | |
|---|---|
| *G01L 23/04* | (2006.01) |
| *G01L 23/10* | (2006.01) |
| *G01L 23/18* | (2006.01) |
| *F23Q 7/00* | (2006.01) |

(52) U.S. Cl.
CPC ................. *G01L 23/04* (2013.01); *G01L 23/10* (2013.01); *G01L 23/18* (2013.01); *F23Q 2007/002* (2013.01)
USPC ..................................... 73/114.18; 73/114.19

(58) Field of Classification Search
USPC .......................................... 73/114.18, 114.19
See application file for complete search history.

(56) References Cited

U.S. PATENT DOCUMENTS

| | | | |
|---|---|---|---|
| 6,979,801 B2 | 12/2005 | Okazaki et al. | |
| 7,032,438 B2 * | 4/2006 | Heinzelmann et al. | 73/114.21 |
| 7,228,730 B2 * | 6/2007 | Haussner et al. | 73/114.19 |
| 7,316,164 B2 * | 1/2008 | Toyoda et al. | 73/723 |
| 7,444,973 B2 * | 11/2008 | Boucard et al. | 123/179.6 |
| 8,205,490 B2 * | 6/2012 | Mueller | 73/114.19 |
| 2005/0252297 A1 * | 11/2005 | Heinzelmann et al. | 73/708 |
| 2006/0053875 A1 * | 3/2006 | Haussner et al. | 73/116 |
| 2006/0090566 A1 * | 5/2006 | Oda | 73/715 |
| 2006/0137655 A1 * | 6/2006 | Dordet | 123/435 |
| 2007/0228030 A1 * | 10/2007 | Boucard et al. | 219/270 |

(Continued)

FOREIGN PATENT DOCUMENTS

| | | |
|---|---|---|
| DE | 10 2004 043 874 A1 | 3/2006 |
| DE | 10 2006 008 639 A1 | 6/2007 |

(Continued)

*Primary Examiner* — Freddie Kirkland, III
(74) *Attorney, Agent, or Firm* — Bose McKinney & Evans LLP

(57) ABSTRACT

The invention relates to a pressure gauge for measuring the pressure in a combustion chamber of an engine, comprising a housing, a tappet, which is movable in the housing in an axial direction under the action of combustion chamber pressure, a sensor for detecting an axial displacement of the tappet, and a force transmitter, in order to transmit a force loading the tappet to the sensor. In accordance with the invention, the force transmitter has at least one damping section for damping flexural vibrations, at which its flexural rigidity is reduced.

10 Claims, 3 Drawing Sheets

(56) References Cited

U.S. PATENT DOCUMENTS

| | | |
|---|---|---|
| 2008/0216786 A1* | 9/2008 | Ramond et al. ............ 123/143 A |
| 2008/0264373 A1 | 10/2008 | Boehland et al. |
| 2009/0026889 A1* | 1/2009 | Wolfer et al. ................. 310/338 |
| 2009/0165739 A1 | 7/2009 | Kern et al. |
| 2009/0320576 A1 | 12/2009 | Borgers et al. |
| 2010/0300186 A1 | 12/2010 | Kern et al. |
| 2011/0240629 A1 | 10/2011 | Wulff et al. |
| 2013/0008886 A1* | 1/2013 | Pottiez et al. ................. 219/538 |
| 2013/0047716 A1* | 2/2013 | Pottiez et al. .............. 73/114.19 |
| 2013/0206092 A1* | 8/2013 | Pottiez et al. ............. 123/145 A |
| 2014/0216145 A1* | 8/2014 | Hau ner et al. ............ 73/114.19 |

FOREIGN PATENT DOCUMENTS

| | | |
|---|---|---|
| DE | 10 2006 049 079 A1 | 4/2008 |
| DE | 10 2010 037 476 A1 | 3/2012 |
| DE | 10 2010 013 598 B4 | 5/2012 |

* cited by examiner

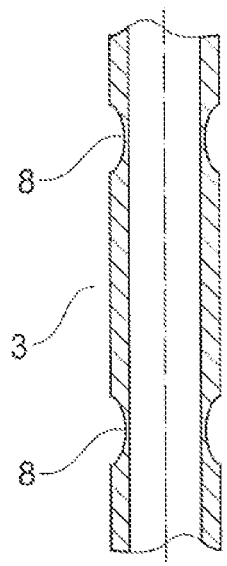
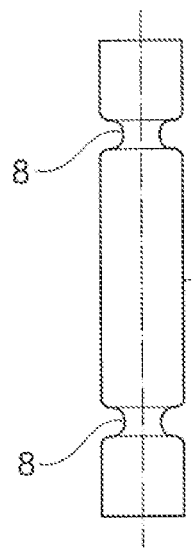
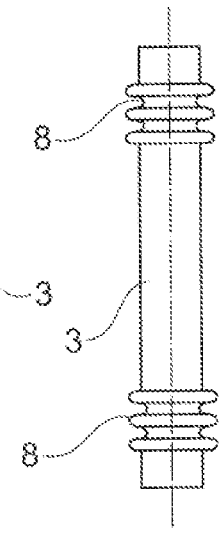
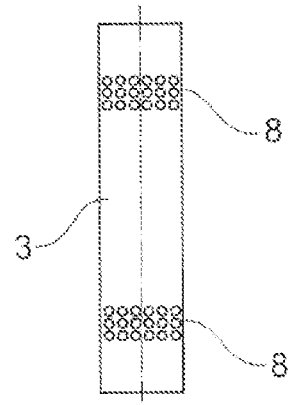
Fig. 3A    Fig. 3B    Fig. 3C    Fig. 3D
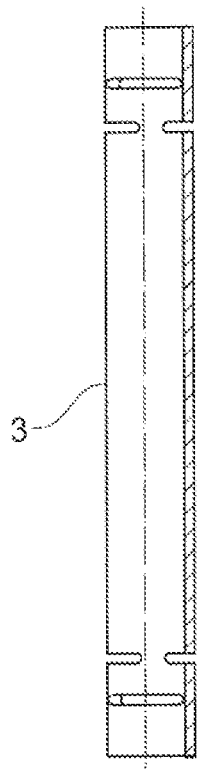
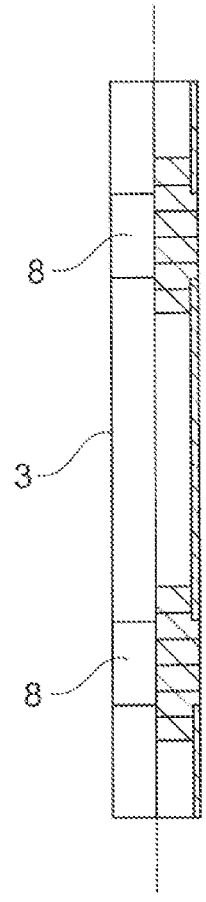
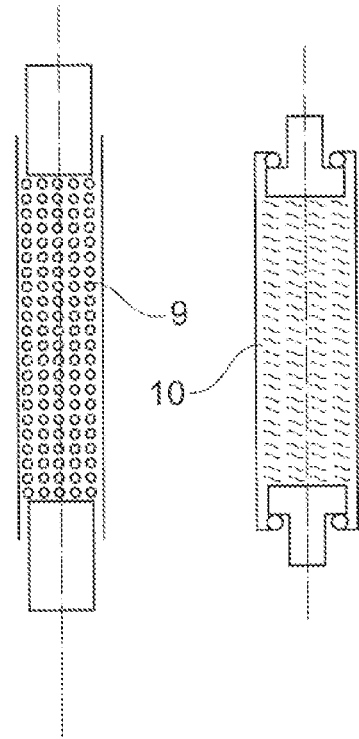
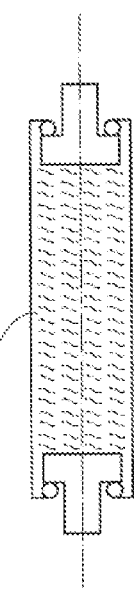
Fig. 3E    Fig. 3F    Fig. 3G    Fig. 3H

PRESSURE GAUGE

RELATED APPLICATIONS

This application claims priority to DE 10 2012 110 142.6, filed Oct. 24, 2012, which is hereby incorporated by reference in its entirety.

BACKGROUND

The invention relates to a pressure gauge for measuring the pressure in a combustion chamber of an engine. Such pressure gauges are generally known from DE 10 2010 037 476 A1.

With pressure gauges of this type, a tappet, which is pressed into the housing of the pressure gauge against a restoring force by the combustion chamber pressure to be measured, is coupled to a sensor via a force transmitter. This sensor measures the transmitted force and thus also the position of the tappet and the combustion chamber pressure.

The pressure in the combustion chamber of an engine changes rather considerably during a working cycle. These changes occur in very short periods of time in accordance with the rotational speed of the engine, such that the measurement of the combustion chamber pressure is characterised by large pressure fluctuations following one another in almost immediate succession.

SUMMARY

The present invention provides a way in which the combustion chamber pressure in the engine of a motor vehicle can be measured with greater precision.

A pressure gauge according to this disclosure can be a glow plug, in which the axially movable tappet is a glow pencil. This is not necessary, however. In the case of diesel engines, a separate glow plug can also be provided in addition to a pressure sensor, and no glow plug is required for Otto engines.

Within the scope of this disclosure, it has been found that, with conventional gauges, flexural vibrations of the tappet or of the glow pencil may form a significant source for interfering signals, which impair the measuring accuracy. Flexural vibrations of the tappet can be excited by pressure changes occurring in the combustion chamber or by vibrations of the engine. If the force transmitter has at least one damping section for damping flexural vibrations, at which its flexural rigidity is reduced, a transmission of the flexural vibrations to the sensor is counteracted and the intensity of the interfering signals is thus advantageously reduced. The force transmitter preferably has at least two damping sections, at which its flexural rigidity is reduced.

The damping section (or one or more of the damping sections) may be a shear force hinge. In this case, the damping section transmits practically no or only negligible shear forces as the flexural rigidity of the force transmitter is greatly reduced at the damping section, in an ideal shear force hinge to zero. A shear force hinge can be formed for example by a portion of the force transmitter in which compressive forces are transmitted via a filling formed from liquid or a packed material, in particular powder or balls.

It is also possible for the damping section (or one or more of the damping sections) to approximately form a bending moment hinge. In this case, the damping section transmits practically no or only negligible bending moments. Here, it is not necessary for the flexural rigidity of the damping section to actually disappear completely. It is sufficient for the flexural rigidity of the damping section or the damping sections to be much smaller than the flexural rigidity of the other portions of the force transmitter. This can be achieved for example in that a cylindrical force transmitter has a reduced thickness at the damping section. A rod-shaped or sleeve-shaped force transmitter can have a reduced diameter at the damping section. In the case of a sleeve-shaped force transmitter, the thickness can also be reduced in that the wall thickness of the sleeve is reduced at the damping section. Alternatively or additionally, the flexural rigidity of a sleeve can also be reduced by incisions running transverse to its longitudinal direction, the depth of said incisions being less than half the diameter of the sleeve in each case.

If the tappet is moved in the axial direction relative to the housing under the action of the combustion pressure, a restoring force can be exerted by a separate spring element or also by the force transmitter. The force transmitter can thus be formed rigidly in the axial direction or can be compressible resiliently. In both cases, the force transmitter can transmit to the sensor a force resultant from the combustion chamber pressure.

If the pressure gauge is a glow plug, the glow pencil must be connected to an internal pole of the glow plug so that it can be supplied with electric current. The sensor can abut the glow pencil. However, this is often unfavourable due to the thermal loading of the sensor. Thus a separate force transmitter can be used in glow plugs that are pressure gauges. The internal pole can be surrounded by the force transmitter. The force transmitter can be formed as a sleeve, for example.

In the case of pressure gauges without a glow pencil, an electrical connection of the tappet is not necessary. The tappet can therefore be of any length, and the sensor can be arranged without difficulty at a larger distance from the end of the tappet on the combustion chamber side. A separate force transmitter is not necessary in this case. With such a pressure gauge, no separate force transmitter is provided, rather the force transmitter is integrated into the tappet. In order to counteract a transmission of flexural vibrations to the sensor, the tappet in this case has at least one damping section, at which its flexural rigidity is reduced.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIGS. 3A-3H show various illustrative embodiments of force transmitters.

DETAILED DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
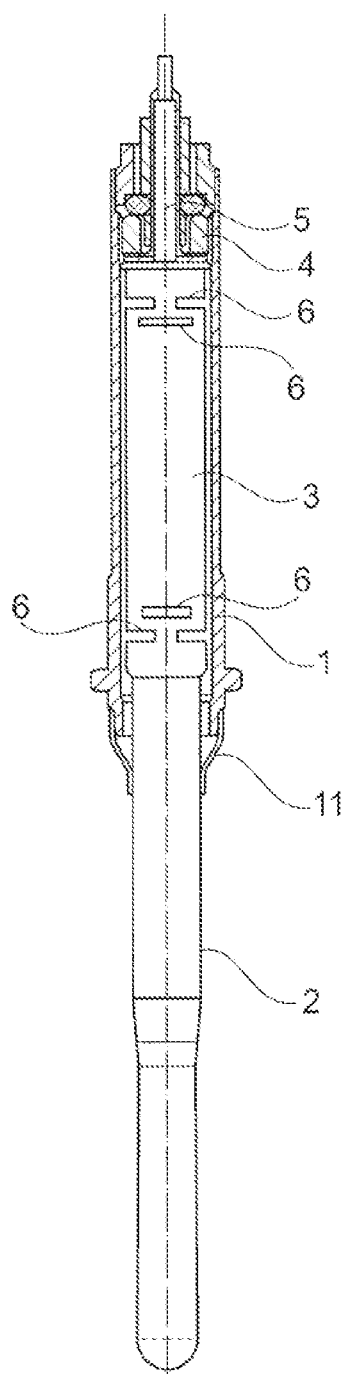
FIG. 1 shows a partly sectional view of a glow plug formed as a pressure gauge.

A pressure gauge in the form of a glow plug is illustrated schematically in FIG. 1. The glow plug has a housing 1 and a tappet in the form of a glow pencil 2, which is movable in the housing 1 in an axial direction under the action of combustion chamber pressure against a restoring force. The restoring force can be exerted for example by a diaphragm 11, which connects the glow pencil 2 to the one-part or multi-part housing 1. Alternatively or additionally, the restoring force can also be exerted by a spring element which is arranged in the housing 1.

The tappet 2 is coupled via a force transmitter 3 to a sensor 4. The sensor 4 can therefore detect an axial displacement of the glow pencil 2. The sensor 4 can, for example, be a piezoelectric sensor or a diaphragm equipped with strain gauges.

The force transmitter 3 can be a sleeve, which surrounds an internal pole 5 of the glow plug connected to the glow pencil 2. As shown in FIG. 1, the internal pole 5 protrudes from the end of the force transmitter remote from the combustion chamber. The force transmitter 3 has a plurality of damping sections, at which its flexural rigidity is reduced. In the embodiment shown, the damping sections are formed by slits 6, which run perpendicular to the longitudinal direction of the force transmitter 3. The depth of the slits 6 is less than half the diameter of the sleeve in each case. The slits 6 are arranged opposite one another in pairs. In the region of the slits 6, the flexural rigidity of the force transmitter 3 is reduced, such that flexural vibrations of the glow pencil 2 can no longer be transmitted to the sensor 4, or can only still be transmitted to a very small extent. The slits 6 thus form damping sections which damp flexural vibrations; more specifically damp the transmission of flexural vibrations of the glow pencil to the sensor 4.

In this embodiment, the force transmitter 3 has two damping sections, which are each formed by two slit pairs, which are offset from another in the peripheral direction. Two slit pairs are in each case preferably offset from another by 90° in the peripheral direction. The sleeve provided with slits 6 can form a bending moment hinge and transmits bending moments only to a negligible extent.

In the embodiment, the slits 6 run in a straight line. The slits may also have a different form however, for example they can be undulating or zigzagged.

Instead of a force transmitter which consists just of a single component, force transmitters that are composed of a number of components can also be used. For example, a further component in addition to the sleeve can be arranged between the glow pencil 2 and the sensor 4. Such a further component can transmit compressive forces and can be, for example, a tube which is filled with liquid or a granular material. The transmission of flexural vibrations of the glow pencil 2 to the sensor 4 can thus be further reduced. Liquids, powder beds or other granular materials damp flexural vibrations very effectively and hardly transmit them. In addition, the transmission of shear forces can thus also be largely reduced, that is to say a shear force hinge is provided between the sensor 4 and glow pencil 2.

The force transmitter 3 transmits the force which results from the combustion chamber pressure and which acts on the glow pencil 2 to the sensor 4. The force transmitter can be fastened to the glow pencil 2 and/or the sensor 4 for this purpose such that both compressive forces and tensile forces can be transmitted, or can be arranged loosely between the glow pencil 2 and the sensor 4 such that only compressive forces can be transmitted. The force transmitter can be fastened directly to the sensor 4 and/or the glow pencil 2 or connect the glow pencil 2 to the force transmitter 3 via connecting elements, for example an intermediate sleeve. The force transmitter can be fastened to the glow pencil or to the sensor, for example by a press-fit, shrink-fit or welded connection.

Figure 2:
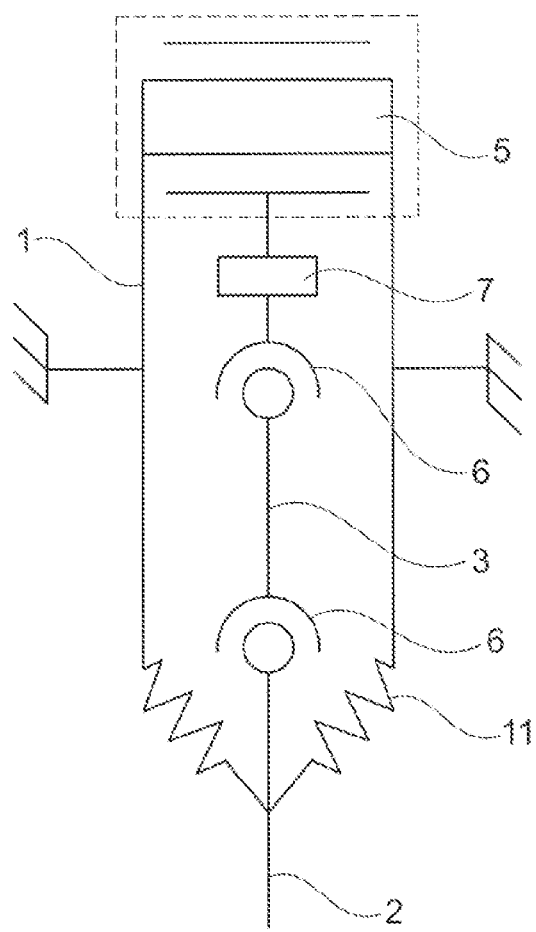
FIG. 2 shows a schematic illustration of a glow plug formed as a pressure gauge.

FIG. 2 schematically shows the mechanical structure of the glow plug illustrated in FIG. 1. The glow pencil 2 is coupled resiliently to the housing 1 of the glow plug. In FIG. 2, corresponding spring elements 11 are illustrated. These spring elements exert a restoring force when the glow pencil 2 is pressed into the housing 1 by combustion chamber pressure. The spring elements 11 can be for example a diaphragm 11 as illustrated in FIG. 1, which fastens the glow pencil 2 to the housing 1 and seals the interior of the glow plug with respect to the combustion chamber.

The sensor 5 is coupled to the glow pencil 2 via a force transmitter 3. Here, the force transmitter 3 has a plurality of damping sections 6. Two of these damping sections are illustrated in FIG. 2 as bending moment hinges and can be formed in each case by two mutually offset pairs of slits, as is described above.

A further damping section 7 in the form of a shear force hinge is additionally illustrated in FIG. 2. Such a shear force hinge can be produced for example in that a portion, via which compressive forces can be transmitted by a packed material or a liquid, is provided between the sensor 4 and the glow pencil 2. For example, a sliding bearing can prevent a transmission of shear forces and can thus form a shear force hinge. In the simplest case, a sliding bearing can be formed by a lubricant film between an end face of the sleeve and an abutting face.

Various illustrative embodiments of force transmitters 3 are illustrated in FIGS. 3A to 3H and each have at least one damping section. These force transmitters can be used individually or also in combination in order to couple the tappet of a pressure gauge to the sensor thereof.

FIG. 3A shows a longitudinal section of a force transmitter 3 in the form of a sleeve. The damping sections 8 of this force transmitter 3 are formed by portions of the sleeve in which the wall thickness of the sleeve is reduced.

FIG. 3B shows a force transmitter 3, in which damping sections 8 are formed by constrictions. This force transmitter can be formed as a sleeve or as a solid rod.

FIG. 3C shows a force transmitter 3 in the form of a sleeve. Portions of this force transmitter are formed as a corrugated pipe. These portions form damping sections 8.

FIG. 3D shows a force transmitter 3 in the form of a sleeve, wherein damping sections 8 are formed by perforated portions of the sleeve.

FIG. 3E shows a partly sectional view of the force transmitter 3 of the embodiment illustrated in FIG. 1.

FIG. 3F shows a partly sectional illustration of a force transmitter 3, which is assembled from a plurality of components. Damping sections 8 of this force transmitter 3 are formed by plastic elements, which are arranged between two sleeves in each case, for example in that their ends plug into the sleeves. These plastic parts can be produced for example from an elastomer. The sleeves can be made of metal, for example.

FIG. 3G shows a force transmitter in the form of a tube, the interior of which is filled with a packed material. The tube and the packed material cause an intense damping of flexural vibrations, such that these are at most transmitted to a negligible extent. The tube filled with the packed material 9 is therefore a damping section.

FIG. 3H shows a force transmitter, in which a damping of flexural vibrations is effected by a liquid 10. The liquid 10 can be arranged in a tube. It is also possible to use a sleeve instead of a tube. In this case, it is preferable if at least one of the ends of the sleeve is coupled in a transversely movable manner to the tappet or the sensor of the pressure gauge. It is therefore indicated in FIG. 3H that the closure of the sleeve is mounted in a transversely movable manner.

In all shown illustrative embodiments, the sensor of the pressure gauge is decoupled from flexural vibrations of the tappet by the damping sections of the force transmitter. Flexural vibrations are thus at best transmitted to the sensor in a manner damped so intensely that they are insignificant for the measuring accuracy. By contrast, the transmission of force in an axial direction and therefore the measured value recordings are thus not impaired by the damping sections.

While exemplary embodiments have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A pressure gauge for measuring the pressure in a combustion chamber of an engine, comprising:
    a housing;
    a tappet, which is movable in the housing in an axial direction under the action of combustion chamber pressure;
    a sensor for detecting an axial displacement of the tappet; and
    a force transmitter for transmitting a force acting on the tappet to the sensor;
    wherein the force transmitter has at least one damping section at which its flexural rigidity is reduced, the damping section being formed in the force transmitter.

2. The pressure gauge according to claim 1, wherein the damping section forms a shear force hinge.

3. The pressure gauge according to claim 1, wherein the damping section forms a bending moment hinge.

4. The pressure gauge according to claim 1, wherein the force transmitter has a sleeve.

5. The pressure gauge according to claim 4, wherein the damping section is formed by a constriction of the sleeve.

6. The pressure gauge according to claim 4, wherein the damping section is formed by slits running transverse to the longitudinal direction of the sleeve, the depth of said slits being less than half the diameter of the sleeve in each case.

7. The pressure gauge according to claim 6, wherein the slits are arranged opposite one another in pairs.

8. The pressure gauge according to claim 7, wherein the damping section is formed by two of said pairs of slits, which are offset from one another in the peripheral direction.

9. The pressure gauge according to claim 7, wherein the tappet is formed as a glow pencil of a glow plug, wherein the force transmitter surrounds an internal pole of the glow plug connected to the glow pencil.

10. A pressure gauge for measuring the pressure in a combustion chamber of an engine, comprising:
    a housing;
    a tappet, which is movable in the housing in an axial direction under the action of combustion chamber pressure; and
    a sensor for detecting an axial displacement of the tappet;
    wherein the tappet has at least one damping section at which its flexural rigidity is reduced, the damping section being formed in the tappet.

* * * * *